United States Patent
Li et al.

(10) Patent No.: US 12,327,090 B2
(45) Date of Patent: Jun. 10, 2025

(54) SEMANTIC UNDERSTANDING METHOD, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Hao Li, Beijing (CN); Zhenyu Jiao, Beijing (CN); Shuqi Sun, Beijing (CN); Yue Chang, Beijing (CN); Tingting Li, Beijing (CN)

(73) Assignee: BEIJING BAIDU NETCOM SCIENCE TECHNOLOGY CO., LTD, Beijing (CN)

( * ) Notice: Subject to any disclaimer, the term of this patent is extended or adjusted under 35 U.S.C. 154(b) by 298 days.

(21) Appl. No.: 18/060,692

(22) Filed: Dec. 1, 2022

(65) Prior Publication Data
US 2023/0089268 A1 Mar. 23, 2023

(30) Foreign Application Priority Data
Dec. 29, 2021 (CN) .......................... 202111642350.4

(51) Int. Cl.
  *G06F 40/56* (2020.01)
  *G06F 16/3329* (2025.01)
  *G06F 40/35* (2020.01)

(52) U.S. Cl.
  CPC .......... *G06F 40/56* (2020.01); *G06F 16/3329* (2019.01); *G06F 40/35* (2020.01)

(58) Field of Classification Search
  CPC ...................................................... G06F 40/56
  See application file for complete search history.

(56) References Cited

U.S. PATENT DOCUMENTS

| 11,437,026 B1* | 9/2022 | Roshan Ghias ........ G10L 15/22 |
| 2008/0104023 A1* | 5/2008 | Dawes ................ G06F 16/3329 |
| 2020/0380991 A1* | 12/2020 | Ge .......................... G10L 15/18 |

FOREIGN PATENT DOCUMENTS

| CN | 111177351 A | 5/2020 |
| CN | 111737411 A | 10/2020 |
| CN | 112256825 A | 1/2021 |
| CN | 113806508 A | 12/2021 |

OTHER PUBLICATIONS

Office Action issued for corresponding Chinese patent application 202111642350.4, mailed Sep. 23, 2022 (15 pages).

* cited by examiner

*Primary Examiner* — Van H Oberly
(74) *Attorney, Agent, or Firm* — Osha Bergman Watanabe & Burton LLP (57) ABSTRACT

A semantic understanding method, includes: acquiring a query statement and a preceding dialogue; rewriting the query statement based on a preset rule to generate a target query statement if it is recognized that the query statement meets a rule rewriting condition according to the query statement and the preceding dialogue; rewriting the query statement based on a rewriting model to generate the target query statement if it is recognized that the query statement does not meet the rule rewriting condition according to the query statement and the preceding dialogue; and performing intention recognition according to the target query statement to generate an intention recognition result.

9 Claims, 5 Drawing Sheets

SEMANTIC UNDERSTANDING METHOD, ELECTRONIC DEVICE, AND STORAGE MEDIUM

CROSS-REFERENCE TO RELATED APPLICATION

This application claims priority to Chinese Patent Application No. 202111642350.4, filed on Dec. 29, 2021, the content of which is hereby incorporated by reference into this disclosure.

TECHNICAL FIELD

The present disclosure relates to the technical fields of deep learning and natural language processing in the technical field of artificial intelligence, and in particular to a semantic understanding method, an electronic device and a storage medium.

BACKGROUND

With the development of artificial intelligence, human-computer interaction has provided great convenience for people's lives, in which conversational artificial intelligence products are becoming more and more common. Such products can provide users with services such as information query and business processing based on multiple rounds of dialogue, which can include two forms of voice dialogue and text dialogue. The machine recognizes the user's intention by semantically understanding voice content or text content input by the user, and provides corresponding services for the user. Wherein multiple rounds of dialogue can also be understood as context-based dialogue.

In related technologies, context-based semantic understanding usually has limitations for specific scenarios, is difficult to apply to general scenarios, and has low generalization and low application efficiency.

SUMMARY

According to a first aspect, a semantic understanding method is provided, which includes: acquiring a query statement and a preceding dialogue; rewriting the query statement based on a preset rule to generate a target query statement if it is recognized that the query statement meets a rule rewriting condition according to the query statement and the preceding dialogue; rewriting the query statement based on a rewriting model to generate the target query statement if it is recognized that the query statement does not meet the rule rewriting condition according to the query statement and the preceding dialogue; and performing intention recognition according to the target query statement to generate an intention recognition result.

According to a second aspect, an electronic device is provided, which includes: at least one processor; and a memory communicatively connected to the at least one processor; wherein instructions executable by the at least one processor are stored in the memory, and the instructions are executed by the at least one processor, so that the at least one processor can execute the semantic understanding method according to the first aspect of the present application.

According to a third aspect, a non-transitory computer-readable storage medium storing computer instructions is provided, wherein the computer instructions are configured to cause the computer to execute the semantic understanding method according to the first aspect of the present application.

It should be understood that what is described in the present section is not intended to identify key or important features of embodiments of the present disclosure, nor is it intended to limit the scope of the present disclosure. Other features of the present disclosure will be readily understood through the following description.

BRIEF DESCRIPTION OF THE DRAWINGS

The accompanying drawings are used to better understand the present solution, and do not constitute a limitation to the present disclosure, in which.

DETAILED DESCRIPTION

Exemplary embodiments of the present disclosure will be described below in conjunction with the accompanying drawings, which include various details of the embodiments of the present disclosure to facilitate understanding, and they should be regarded as exemplary only. Accordingly, those of ordinary skill in the art will recognize that various changes and modifications of the embodiments described herein can be made without departing from the scope and spirit of the present disclosure. Also, descriptions of well-known functions and constructions are omitted in the following description for clarity and conciseness.

Artificial Intelligence (AI for short) is a technical science that studies and develops theories, methods, technologies and application systems for simulating, extending and expanding human intelligence. At present, AI technology has the advantages of high automation, high precision, and low cost, and has been widely used.

Deep Learning (DL for short) is a new research direction in the field of Machine Learning (ML for short), which learns internal laws and representation levels of sample data. Information obtained during these learning processes is of great help in the interpretation of data such as text, images and sounds. Its ultimate goal is to enable machines to have the ability to analyze and learn like humans, and to be able to recognize data such as text, images, and sounds. As far as the specific research content is concerned, it mainly includes neural network systems based on convolution operations, namely convolutional neural networks; self-encoding neural networks based on multi-layer neurons; pre-training in the form of multi-layer self-encoding neural networks, and then combining with deep belief networks which further optimize neural network weights in combination with discriminative information. Deep learning has achieved many harvests in search technology, data mining, machine learning, machine translation, natural language processing, multimedia learning, speech, recommendation and personalization technology, and other related fields. Deep learning enables machines to imitate human activities such as seeing, listening and thinking, and solves many complex pattern recognition problems, making great progress in artificial intelligence-related technologies.

Natural Language Processing (NLP for short) is an important direction in the field of computer science and the field of artificial intelligence, which mainly studies various theories and methods that can realize effective communication between humans and computers using natural language. Natural Language Processing is a science that combines linguistics, computer science, and mathematics. Therefore, research in this field will involve natural language, that is, the language that people use every day, so it is closely related to the study of linguistics, but has important differences. Natural Language Processing is not general study of natural language, but development of computer systems that can effectively realize natural language communication, especially software systems therein. As such it is a part of computer science.

The semantic understanding method, apparatus, electronic device and storage medium of the embodiments of the present disclosure will be described below with reference to the accompanying drawings.

Figure 1:
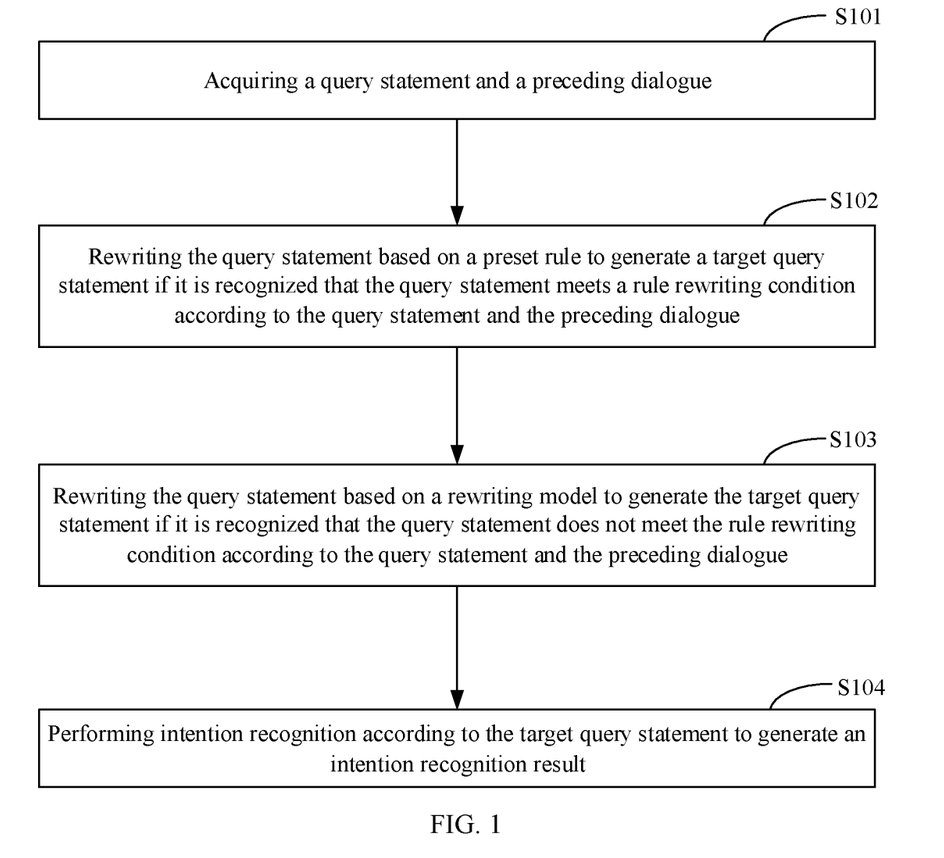
FIG. 1 is a schematic flowchart of a semantic understanding method according to a first embodiment of the present disclosure.

FIG. 1 is a schematic flowchart of a semantic understanding method according to a first embodiment of the present disclosure.

As shown in FIG. 1, the semantic understanding method of the embodiment of the present disclosure may specifically include the following steps:

S101 of acquiring a query statement and a preceding dialogue.

Specifically, the execution subject of the semantic understanding method of the embodiment of the present disclosure may be the semantic understanding apparatus provided by the embodiment of the present disclosure, and the semantic understanding apparatus may be a hardware device with data information processing capabilities and/or prerequisite software required to drive the hardware device to work. Optionally, the execution subject may include workstations, servers, computers, user terminals and other devices. Wherein the user terminal includes, but is not limited to, a mobile phone, a computer, an intelligent voice interaction device, a smart home appliance, a vehicle terminal, and the like.

The embodiment of the present disclosure takes multiple rounds of dialogue in the form of text as an example to illustrate the semantic understanding method of the embodiment of the present disclosure, wherein the query statement currently input by the user and the content of the dialogue before the query statement (i.e., the preceding dialogue) are acquired.

S102 of rewriting the query statement based on a preset rule to generate a target query statement if it is recognized that the query statement meets a rule rewriting condition according to the query statement and the preceding dialogue.

In the embodiment of the present disclosure, a rule and a rule rewriting condition will be preset, and whether the query statement meets the rule rewriting condition will be recognized according to the query statement and the preceding dialogue, and if it is met, the query statement will be rewritten according to the preset rule, for example, keywords will be extracted from the preceding dialogue based on the preset rule, and the keywords will be filled into the query statement to generate a semantically complete target query statement.

S103 of rewriting the query statement based on a rewriting model to generate the target query statement if it is recognized that the query statement does not meet the rule rewriting condition according to the query statement and the preceding dialogue.

In the embodiment of the present disclosure, whether the query statement meets the rule rewriting condition will be recognized according to the query statement and the preceding dialogue, and if it is not met, the query statement will be rewritten according to the rewriting model, wherein the rewriting model may be a trained sequence-to-sequence (seq2seq) model, and a semantically complete target query statement will be generated through the rewriting model. Model rewriting rewrites the query statement that does not meet the rule rewriting condition, so as to cover a variety of application scenarios, and in the meantime avoid manually summarizing all the rules, which can greatly reduce labor costs.

S104 of performing intention recognition according to the target query statement to generate an intention recognition result.

In the embodiment of the present disclosure, intention recognition will be performed on the rewritten target query statement, and an intention recognition result will be generated, that is, the intention corresponding to the query statement currently sent by the user, so as to provide the user with target information according to the intent.

For example, in a dialogue scenario between the user and a robot regarding diamond card application, the content of the preceding dialogue is: "User: condition for diamond card application. Robot: an annual deposit of 1 million yuan or more is required." The user's current query statement is: "What about the annual fee?". Whether the query statement meets the rule rewriting condition will be determined according to the preceding dialogue and the query statement. By rewriting the query statement by using the preset rule or the rewriting model, a target query statement "What about the annual fee for a diamond card?" can be obtained, and according to "What about the annual fee for a diamond card?", an intention recognition will be performed and an intention recognition result will be generated, for example, information on the annual fee of the diamond card will be acquired, so that target information can be provided to the user according to the intention recognition result.

To sum up, in the semantic understanding method of the embodiment of the present disclosure, a query statement and a preceding dialogue will be acquired, the query statement will be rewritten based on a preset rule to generate a target query statement if it is recognized that the query statement meets a rule rewriting condition according to the query statement and the preceding dialogue, and the query statement will be rewritten based on a rewriting model to generate the target query statement if it is recognized that the query statement does not meet the rule rewriting condition according to the query statement and the preceding dialogue, and intention recognition will be performed according to the target query statement to generate an intention recognition result. In the embodiment of the present disclosure, the query statement can be rewritten according to one of the two methods of rewriting according to a query statement selection rule and model rewriting, which can be suitable for various application scenarios and only needs to perform an intention recognition for a rewritten target query statement, and which reduces duration of semantic understanding. This method has high generalization, and reduces time-consuming and performance requirements as much as possible while ensuring the effect, so as to meet the online demand.

Figure 2:
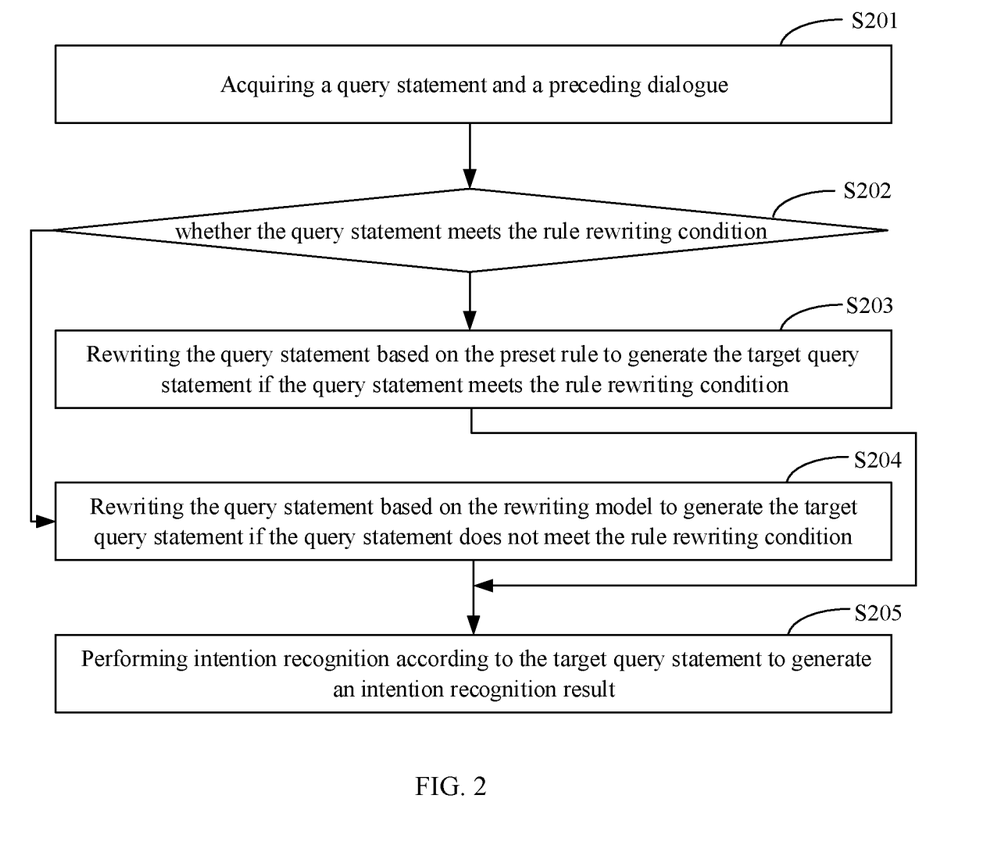
FIG. 2 is a schematic flowchart of a semantic understanding method according to a second embodiment of the present disclosure.

FIG. 2 is a schematic flowchart of a semantic understanding method according to a second embodiment of the present disclosure.

As shown in FIG. 2, on the basis of the embodiment shown in FIG. 1, the semantic understanding method of the embodiment of the present disclosure may specifically include the following steps:

S201 of acquiring a query statement and a preceding dialogue.

S202 of recognizing that the query statement meets the rule rewriting condition according to the query statement, the preceding dialogue and a preset keyword structure pair, the keyword structure pair including two corresponding keywords.

In the embodiment of the present disclosure, for different application scenarios, keyword structure pairs will be extracted based on offline data, such as keyword structure pairs of credit card-annual fee, credit card-limit, handling-credit card and the like, and whether the query statement meets the rule rewriting condition will be recognized according to the query statement, the preceding dialogue and the preset keyword structure pair, the keyword structure pair including two corresponding keywords.

As a feasible implementation, according to the keyword structure pair, it is recognized that the query statement lacks the corresponding keyword, and it is judged whether the missing keyword exists in the preceding dialogue, so as to determine whether the query statement meets the rule rewriting condition. For example, if the keyword annual fee exists in the query statement, and a word (such as credit card) that can form a structural pair with the query statement exists in the preceding dialogue, then it can be considered that the query statement meets the rule rewriting condition; conversely, if no word that satisfies the corresponding relationship of the keyword structure pair exists in the query statement and the preceding dialogue, it can be considered that the query statement does not meet the rule rewriting condition.

S203 of rewriting the query statement based on the preset rule to generate the target query statement if the query statement meets the rule rewriting condition.

S204 of rewriting the query statement based on the rewriting model to generate the target query statement if the query statement does not meet the rule rewriting condition.

S205 of performing intention recognition according to the target query statement to generate an intention recognition result.

Specifically, the step S201 is the same as the above-mentioned step S101, and the steps S203-S205 are the same as the above-mentioned steps S102-S104, which will not be repeated here.

In some embodiments, the intention recognition model may be used to perform intention recognition on the target query statement: the target query statement will be input into the intention recognition model to generate an intention recognition result.

In a specific implementation, a single-round intention recognition model may be constructed based on a deep learning model, and the target query statement may be input into the intention recognition model to obtain the intention recognition result.

It does not need to consider information on the preceding dialogue, and intention recognition will be performed only for the target query statement corresponding to the current round, effectively avoiding redundant information interference. When performing training for the single-round intention recognition model, since the single-round model is easier to converge, the amount of data required is smaller, and at the same time, the model structure can be simplified, the number of parameters of the model can be reduced, and the duration for semantic understanding can be shortened.

To sum up, in the semantic understanding method of the embodiment of the present disclosure, a query statement and a preceding dialogue will be acquired, the query statement will be rewritten based on a preset rule to generate a target query statement if it is recognized that the query statement meets a rule rewriting condition according to the query statement and the preceding dialogue, and the query statement will be rewritten based on a rewriting model to generate the target query statement if it is recognized that the query statement does not meet the rule rewriting condition according to the query statement and the preceding dialogue, and intention recognition will be performed according to the target query statement to generate an intention recognition result. In the embodiment of the present disclosure, the query statement can be rewritten according to one of the two methods of rewriting according to a query statement selection rule and model rewriting, which can be suitable for various application scenarios and only needs to perform an intention recognition for a rewritten target query statement, and which reduces duration of semantic understanding. This method has high generalization, and reduces time-consuming and performance requirements as much as possible while ensuring the effect, so as to meet the online demand.

Figure 3:
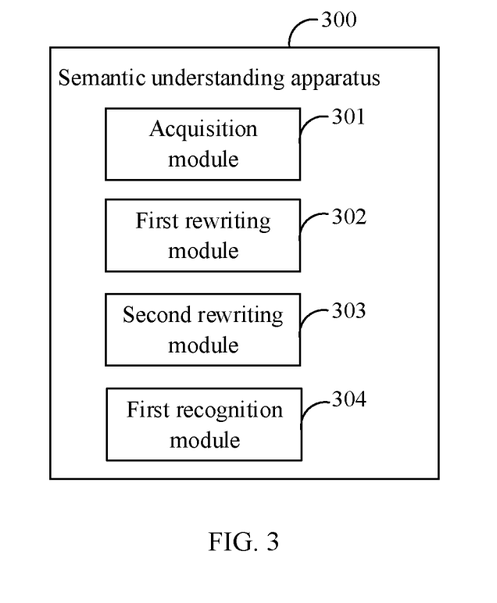
FIG. 3 is a block diagram of a semantic understanding apparatus according to a first embodiment of the present disclosure.

FIG. 3 is a block diagram of a semantic understanding apparatus according to the first embodiment of the present disclosure.

As shown in FIG. 3, the semantic understanding apparatus 300 of the embodiment of the present disclosure includes: an acquisition module 301, a first rewriting module 302, a second rewriting module 303 and a first recognition module 304.

the acquisition module 301 is configured to acquire a query statement and a preceding dialogue.

the first rewriting module 302 is configured to rewrite the query statement based on a preset rule to generate a target query statement if it is recognized that the query statement meets a rule rewriting condition according to the query statement and the preceding dialogue.

the second rewriting module 303 is configured to rewrite the query statement based on a rewriting model to generate the target query statement if it is recognized that the query statement does not meet the rule rewriting condition according to the query statement and the preceding dialogue.

the first recognition module 304 is configured to perform intention recognition according to the target query statement to generate an intention recognition result.

It should be noted that the above explanations of the semantic understanding method embodiment are also applicable to the semantic understanding apparatus of the embodiment of the present disclosure, and the specific process will not be repeated here.

To sum up, in the semantic understanding apparatus of the embodiment of the present disclosure, a query statement and a preceding dialogue will be acquired, the query statement will be rewritten based on a preset rule to generate a target query statement if it is recognized that the query statement meets a rule rewriting condition according to the query statement and the preceding dialogue, and the query statement will be rewritten based on a rewriting model to generate the target query statement if it is recognized that the query statement does not meet the rule rewriting condition according to the query statement and the preceding dialogue, and intention recognition will be performed according to the target query statement to generate an intention recognition result. In the embodiment of the present disclosure, the query statement can be rewritten according to one of the two methods of rewriting according to a query statement selection rule and model rewriting, which can be suitable for various application scenarios and only needs to perform an intention recognition for a rewritten target query statement, and which reduces duration of semantic understanding. This method has high generalization, and reduces time-consuming and performance requirements as much as possible while ensuring the effect, so as to meet the online demand.

Figure 4:
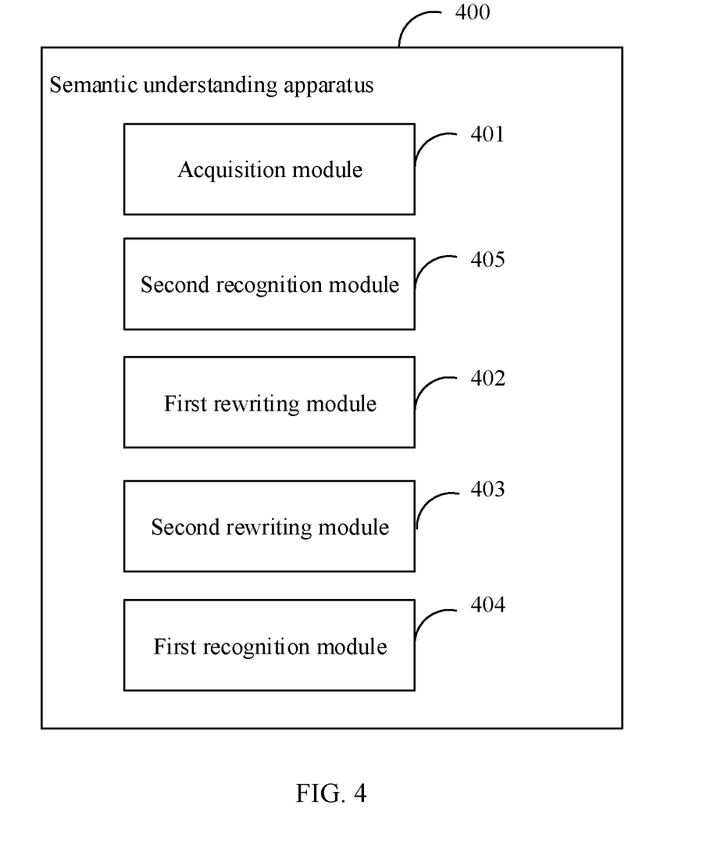
FIG. 4 is a block diagram of a semantic understanding apparatus according to a second embodiment of the present disclosure.

FIG. 4 is a block diagram of a semantic understanding apparatus according to the second embodiment of the present disclosure.

As shown in FIG. 4, the semantic understanding apparatus 400 of the embodiment of the present disclosure includes: an acquisition module 401, a first rewriting module 402, a second rewriting module 403 and a first recognition module 404.

Wherein the acquisition module 401 has the same structure and function as the acquisition module 301 in the previous embodiment, the first rewriting module 402 has the same structure and function as the first rewriting module 302 in the previous embodiment, the second rewriting module 403 has the same structure and function as the second rewriting module 303 in the previous embodiment, and the first recognition module 404 has the same structure and function as the first recognition module 304 in the previous embodiment.

Further, the semantic understanding apparatus 100 further includes: a second recognition module 405 configured to recognize that the query statement meets the rule rewriting condition according to the query statement, the preceding dialogue and a preset keyword structure pair, the keyword structure pair including two corresponding keywords.

Further, the second recognition module 405 includes: a determining unit configured to determine that the query statement meets the rule rewriting condition if it is recognized that the query statement lacks a corresponding keyword according to the keyword structure pair and the missing keyword exists in the preceding dialogue.

Further, the first recognition module 404 includes: an input unit configured to input the target query statement into an intention recognition model to generate the intention recognition result.

Further, the rewriting model is a seq2seq model.

To sum up, in the semantic parsing apparatus of the embodiment of the present disclosure, a query statement and a preceding dialogue will be acquired, the query statement will be rewritten based on a preset rule to generate a target query statement if it is recognized that the query statement meets a rule rewriting condition according to the query statement and the preceding dialogue, and the query statement will be rewritten based on a rewriting model to generate the target query statement if it is recognized that the query statement does not meet the rule rewriting condition according to the query statement and the preceding dialogue, and intention recognition will be performed according to the target query statement to generate an intention recognition result. In the embodiment of the present disclosure, the query statement can be rewritten according to one of the two methods of rewriting according to a query statement selection rule and model rewriting, which can be suitable for various application scenarios and only needs to perform an intention recognition for a rewritten target query statement, and which reduces duration of semantic understanding. This method has high generalization, and reduces time-consuming and performance requirements as much as possible while ensuring the effect, so as to meet the online demand.

In the technical solution of the present disclosure, process, such as collection, storage, use, processing, transmission, provision, disclosure and the like, of user personal information involved are all in compliance with relevant laws and regulations, and do not violate public order and good customs.

According to the embodiments of the present disclosure, the present disclosure also provides an electronic device, a readable storage medium, and a computer program product.

Figure 5:
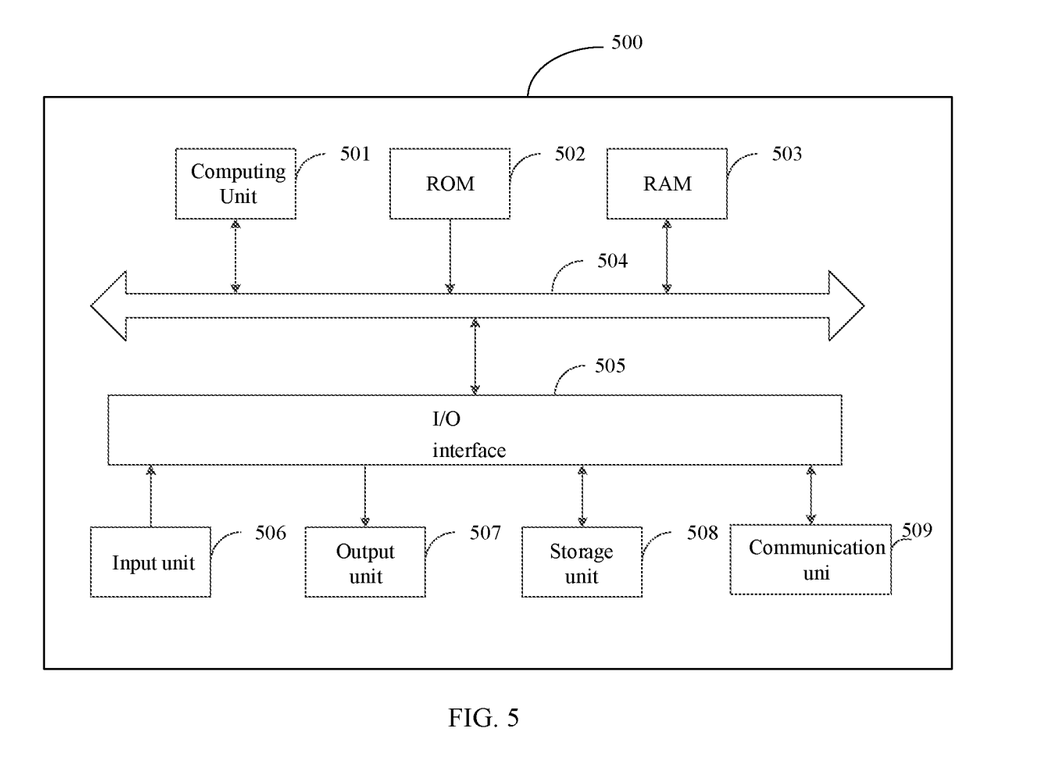
FIG. 5 is a block diagram of an electronic device used to implement the method of embodiments of the present disclosure.

FIG. 5 shows a schematic block diagram of an example electronic device 500 that may be used to implement embodiments of the present disclosure. An electronic device is intended to represent various forms of digital computers, such as laptops, desktops, workstations, personal digital assistants, servers, blade servers, mainframes, and other suitable computers. An electronic device may also represent various forms of mobile apparatuses, such as personal digital processing, cellular telephones, smart phones, wearable devices, and other similar computing apparatuses. The components shown herein, their connections and relationships, and their functions, are by way of example only, and are not intended to limit implementations of the present disclosure described and/or claimed herein.

As shown in FIG. 5, an electronic device 500 includes a computing unit 501 that can perform various appropriate actions and processes according to a computer program stored in a read-only memory (ROM) 502 or a computer program loaded from a storage unit 508 into a random access memory (RAM) 503. Various appropriate actions and processes are performed. In the RAM 503, various programs and data necessary for the operation of the electronic device 500 can also be stored. The computing unit 501, the ROM 502, and the RAM 503 are connected to each other through a bus 504. An input/output (I/O) interface 505 is also connected to the bus 504.

Multiple components in the electronic device 500 are connected to the I/O interface 505, including: an input unit 506, such as a keyboard, a mouse, etc.; an output unit 507, such as various types of displays, speakers, etc.; a storage unit 508, such as a magnetic disk, an optical disk, and the like; and a communication unit 509, such as a network card, a modem, a wireless communication transceiver, and the like. The communication unit 509 allows the electronic device 500 to exchange information/data with other devices through a computer network such as the Internet and/or various telecommunication networks.

The computing unit 501 may be various general-purpose and/or special-purpose processing components having processing and computing capabilities. Some examples of the computing unit 501 include, but are not limited to, central processing units (CPUs), graphics processing units (GPUs), various dedicated artificial intelligence (AI) computing chips, various computing units that run machine learning model algorithms, digital signal processing processor (DSP), and any suitable processors, controllers, microcontrollers, and the like. The computing unit 501 executes various methods and processes described above, such as the semantic parsing methods shown in FIG. 1 to FIG. 2. For example, in some embodiments, the semantic parsing methods may be implemented as computer software programs, which are tangibly included in a machine-readable medium, such as the storage unit 508. In some embodiments, part or all of the computer programs can be loaded and/or installed on the electronic device 500 via the ROM 502 and/or the communication unit 509. When the computer program is loaded into the RAM 503 and executed by the computing unit 501, one or more steps of the semantic parsing methods described above may be executed. Alternatively, in other embodiments, the computing unit 501 may be configured to execute the semantic parsing methods in any other appropriate manner (for example, by means of firmware).

Various embodiments of the systems and techniques described above herein can be implemented in digital electronic circuit systems, integrated circuit systems, field programmable gate arrays (FPGAs), application specific integrated circuits (ASICs), application specific standard products (ASSPs), system of System-On-Chip (SOC), Load Programmable Logic Device (CPLD), computer hardware, firmware, software, and/or combinations thereof. These various embodiments may include: being implemented in one or more computer programs, which can be executed and/or interpreted on a programmable system including at least one programmable processor, and the programmable processor may be a special-purpose or a general-purpose programmable processor, can receive data and instructions from a storage system, at least one input device, and at least one output device, and transmit data and instructions to this storage system, this at least one input device, and this at least one output device.

Program codes for implementing the methods of the present disclosure may be written in any combination of one or more programming languages. These program codes may be provided to a processor or a controller of a general-purpose computer, a special purpose computer, or other programmable data processing devices, so that the program codes, when executed by the processor or the controller, cause functions/operations specified in the flow diagrams and/or the block diagrams to be implemented. The program codes may be executed entirely on a machine, partly on a machine, as a stand-alone software package partly on a machine and partly on a remote machine or entirely on the remote machine or a server.

In the context of the present disclosure, the machine-readable medium may be a tangible medium that may contain or store a program for use by or in conjunction with an instruction execution system, an apparatus, or a device. The machine-readable medium may be a machine-readable signal medium or a machine-readable storage medium. The machine-readable medium may include, but is not limited to, electronic, magnetic, optical, electromagnetic, infrared, or semiconductor systems, apparatus, or devices, or any suitable combination of the foregoing. More specific examples of machine-readable storage media would include electrical connections based on one or more wires, portable computer disks, hard disks, Random Access Memories (RAMs), Read Only Memories (ROMs), Erasable Programmable Read Only Memories (EPROMs or flash memories), fiber optics, portable compact disk read-only memories (CD-ROMs), optical storage devices, magnetic storage devices, or any suitable combination of the foregoing.

To provide for interaction with a user, the systems and techniques described here can be implemented on a computer, which has: a display device (for example, a CRT (cathode ray tube) or LCD (liquid crystal display) monitor) for displaying information to the user; and a keyboard and pointing device (for example, a mouse or a trackball), through which the user can provide input to the computer. Other kinds of devices may also be used to provide interaction with the user; for example, feedback provided to the user may be any form of sensory feedback (for example, visual feedback, auditory feedback, or tactile feedback); and input from the user may be received in any form (including acoustic input, voice input, or tactile input).

The systems and techniques described here may be implemented in a computing system (for example, as a data server) that includes back-end components, or a computing system (for example, an application server) that includes middleware components, or a computing system (for example, a user computer having a graphical user interface or a web browser, through which a user can interact with embodiments of the systems and techniques described here) that includes front-end components, or a computing system that includes any combination of such back-end components, middleware components, or front-end components. The components of the system can be interconnected by any form or medium of digital data communication (for example, a communication network). Examples of the communication network include: local area networks (LANs), wide area networks (WANs), the Internet, and blockchain networks.

The computer system may include clients and servers. Clients and servers are generally remote from each other and typically interact through a communication network. The relationship of client and server will be generated by computer programs running on the respective computers and having a client-server relationship to each other. The server may be a cloud server, also known as cloud computing server or cloud host, which is a host product in the cloud computing service system to solve defects such as difficult management and weak business scalability existing in the traditional physical host and the VPS service ("Virtual Private Server", or "VPS" for short). The server may also be a server of a distributed system, or a server combined with a blockchain.

According to an embodiment of the present disclosure, the present disclosure further provides a computer program product, including a computer program, wherein when the computer program is executed by a processor, the steps of the semantic parsing methods according to the above-described embodiments of the present disclosure are implemented.

It should be understood that steps may be reordered, added or deleted using the various forms of flow shown above. For example, the respective steps disclosed in the present disclosure may be executed in parallel, may also be executed sequentially, or may also be executed in a different order, as long as the desired result of the technical solutions disclosed in the present disclosure can be achieved, and no limitation is imposed thereto herein.

The specific embodiments described above do not constitute a limitation on the protection scope of the present disclosure. It should be apparent to those skilled in the art that various modifications, combinations, sub-combinations and substitutions may be made depending on design requirements and other factors. Any modifications, equivalent replacements and improvements made within the spirit and the principle of the present disclosure shall be included within the protection scope of the present disclosure.

What is claimed is:

1. A semantic understanding method, comprising:
acquiring a query statement and a preceding dialogue;
rewriting the query statement based on a preset rule to generate a target query statement in response to recognizing that the query statement meets a rule rewriting condition according to the query statement and the preceding dialogue;

rewriting the query statement based on a rewriting model to generate the target query statement in response to recognizing that the query statement does not meet the rule rewriting condition according to the query statement and the preceding dialogue;

performing intention recognition according to the target query statement to generate an intention recognition result; and recognizing that the query statement meets the rule rewriting condition according to the query statement, the preceding dialogue and a preset keyword structure pair, the keyword structure pair including two corresponding keywords;

wherein the recognizing that the query statement meets the rule rewriting condition according to the query statement, the preceding dialogue and the preset keyword structure pair comprises:

determining that the query statement meets the rule rewriting condition in response to recognizing that the query statement lacks a corresponding keyword according to the keyword structure pair and the missing keyword exists in the preceding dialogue.

2. The semantic understanding method according to claim 1, wherein the performing intention recognition according to the target query statement to generate the intention recognition result comprises:

inputting the target query statement into an intention recognition model to generate the intention recognition result.

3. The semantic understanding method according to claim 1, wherein the rewriting model is a seq2seq model.

4. An electronic device, comprising:

a processor; and a memory communicatively connected to the processor; wherein the memory is configured to store instructions executable by the processor and the processor is configured to execute the instructions to:

acquire a query statement and a preceding dialogue;

rewrite the query statement based on a preset rule to generate a target query statement in response to recognizing that the query statement meets a rule rewriting condition according to the query statement and the preceding dialogue;

rewrite the query statement based on a rewriting model to generate the target query statement in response to recognizing that the query statement does not meet the rule rewriting condition according to the query statement and the preceding dialogue;

perform intention recognition according to the target query statement to generate an intention recognition result;

recognize that the query statement meets the rule rewriting condition according to the query statement, the preceding dialogue and a preset keyword structure pair, the keyword structure pair including two corresponding keywords; and determine that the query statement meets the rule rewriting condition in response to recognizing that the query statement lacks a corresponding keyword according to the keyword structure pair and the missing keyword exists in the preceding dialogue.

5. The electronic device according to claim 4, wherein the processor is configured to execute the instructions to:

input the target query statement into an intention recognition model to generate the intention recognition result.

6. The electronic device according to claim 4, wherein the rewriting model is a seq2seq model.

7. A non-transitory computer-readable storage medium storing computer instructions, wherein the computer instructions are configured to cause the computer to execute a semantic understanding, the method comprising:

acquiring a query statement and a preceding dialogue;

rewriting the query statement based on a preset rule to generate a target query statement in response to recognizing that the query statement meets a rule rewriting condition according to the query statement and the preceding dialogue;

rewriting the query statement based on a rewriting model to generate the target query statement in response to recognizing that the query statement does not meet the rule rewriting condition according to the query statement and the preceding dialogue; and performing intention recognition according to the target query statement to generate an intention recognition result; and recognizing that the query statement meets the rule rewriting condition according to the query statement, the preceding dialogue and a preset keyword structure pair, the keyword structure pair including two corresponding keywords;

wherein the recognizing that the query statement meets the rule rewriting condition according to the query statement, the preceding dialogue and the preset keyword structure pair comprises:

determining that the query statement meets the rule rewriting condition in response to recognizing that the query statement lacks a corresponding keyword according to the keyword structure pair and the missing keyword exists in the preceding dialogue.

8. The non-transitory computer-readable storage medium according to claim 7, wherein the performing intention recognition according to the target query statement to generate the intention recognition result comprises:

inputting the target query statement into an intention recognition model to generate the intention recognition result.

9. The non-transitory computer-readable storage medium according to claim 7, wherein the rewriting model is a seq2seq model.

* * * * *